(12) United States Patent
Hager

(10) Patent No.: US 9,103,447 B1
(45) Date of Patent: Aug. 11, 2015

(54) METHOD AND SYSTEM OF VALVE REFURBISHMENT

(71) Applicant: Hager Industries, LLC, Rock Springs, WY (US)

(72) Inventor: Nathan Hager, Rock Springs, WY (US)

(73) Assignee: Hager Industries, LLC, Rock Springs, WY (US)

( * ) Notice: Subject to any disclaimer, the term of this patent is extended or adjusted under 35 U.S.C. 154(b) by 77 days.

(21) Appl. No.: 14/179,928

(22) Filed: Feb. 13, 2014

(51) Int. Cl.
*F16K 27/06* (2006.01)
*F16K 5/02* (2006.01)
*B23P 15/00* (2006.01)

(52) U.S. Cl.
CPC .............. *F16K 5/0271* (2013.01); *B23P 15/001* (2013.01); *F16K 5/0292* (2013.01); *F16K 27/06* (2013.01); *Y10T 137/0486* (2015.04); *Y10T 137/0519* (2015.04)

(58) Field of Classification Search
CPC ..... F16K 5/0271; F16K 5/0292; F16K 27/00; F16K 27/06–27/067; B23P 15/001; Y10T 137/0486; Y10T 137/0491; Y10T 137/0519
USPC ............ 251/309, 366, 368; 137/15.17, 15.18, 137/15.24
See application file for complete search history.

(56) References Cited

U.S. PATENT DOCUMENTS

| | | | |
|---|---|---|---|
| 3,703,910 A | 11/1972 | Smith | |
| 4,055,324 A | 10/1977 | Hughes et al. | |
| 4,122,817 A | 10/1978 | Matlock | |
| 4,286,770 A * | 9/1981 | Jackson | 251/285 |
| 4,364,542 A * | 12/1982 | Meyer | 251/214 |
| 4,506,696 A | 3/1985 | von Pechmann | |
| 4,529,169 A | 7/1985 | Johns et al. | |
| 4,686,348 A | 8/1987 | Johns et al. | |
| 4,919,391 A * | 4/1990 | Kemp | 251/148 |
| 5,624,717 A | 4/1997 | Proner et al. | |
| 5,762,089 A | 6/1998 | Haeberle et al. | |
| 5,881,996 A | 3/1999 | Walsh, Jr. et al. | |
| 7,204,474 B2 | 4/2007 | McGuire et al. | |
| 7,845,619 B2 | 12/2010 | Artherholt | |
| 8,166,993 B2 * | 5/2012 | Childers | 137/15.18 |
| 8,205,860 B2 | 6/2012 | Song | |
| 8,297,592 B2 | 10/2012 | McGuire et al. | |
| 2009/0078906 A1 * | 3/2009 | Shafer et al. | 251/368 |
| 2013/0181155 A1 * | 7/2013 | Robison et al. | 251/324 |

OTHER PUBLICATIONS

Midalloy; Midalloy ERNiCrCoMo-1 (FM617) Bare Wire; Technical Bulletin; Oct. 15, 2010; 2 pages; Midalloy, St. Louis, Missouri.

\* cited by examiner

*Primary Examiner* — John Bastianelli

(57) ABSTRACT

A valve assembly is disclosed with a housing having generally collinear inlet and outlet ports in the side walls thereof and an interior annular face about each of the inlet and outlet ports. The housing is made of a first metal with a yield strength. The assembly also has a chamber disposed between the inlet and outlet ports, wherein a vertical axis of the chamber is normal to longitudinal axes of the inlet and outlet ports. An annular groove is disposed about the interior annular face of the inlet port and the interior annular face of the outlet port. A second metal is disposed within each of the annular grooves, the second metal having a yield strength greater than the yield strength of the first metal.

13 Claims, 4 Drawing Sheets

METHOD AND SYSTEM OF VALVE REFURBISHMENT

FIELD OF THE INVENTION

The present invention relates to valves and more particularly to an improved method and system of refurbishing high pressure valves that have been subjected to extreme wear.

BACKGROUND OF THE INVENTION AND RELATED ART

Valves, including plug valves, have been used as a means for reliable flow isolation in high pressure flow line applications. Problems, however, exist with respect to the sealing capability of these devices when used in connection with fluids containing abrasive materials. The present invention relates to the sealing problems at the interface of the rotatable member found in such valves and their respective valve seats.

Prior attempts to seal the interface between the rotatable member and seats found in plug valves have included placement of O-rings within grooves located in the face of the plug or the body of the valve itself. The O-ring design, as well as reliance on other gasket-type sealing devices, results in valve seal failure when used in high pressure environments (e.g., 10,000 to 15,000 psi) containing abrasive matter. Industry standards require that valves used in high pressure applications operate within permissible pressure ranges with minimal permissible levels of leakage. When operating in a high pressure environment, abrasive materials, such as sand, abrade the inner surface of the valve body and plug, including any grooved areas. As the inner surface is abraded, the interference fit between the valve and valve seats is decreased thereby lessening the sealing capability of the valve. Valves must be tested on a regular basis and if they do not pass inspection, they must be replaced resulting in undesirable costs and lost work hours and efficiency during the replacement of the valve.

A need exists, therefore, for improved systems and methods for valve refurbishment and/or strengthening of valves to improve the sealing function and decrease maintenance costs and lost time associated with valve failure.

SUMMARY OF THE INVENTION

In light of the problems and deficiencies inherent in the prior art, the present invention seeks to overcome these by providing a valve assembly with a strengthened inner wall. In accordance with one embodiment of the invention, a valve assembly is disclosed comprising a housing having generally collinear inlet and outlet ports in the side walls thereof and an interior annular face about each of the inlet and outlet ports, the housing comprising a first metal with a yield strength. A chamber is disposed between the inlet and outlet ports, wherein a vertical axis of the chamber is normal to longitudinal axes of the inlet and outlet ports. A sealing member is disposed within the chamber and an annular groove is disposed about the interior annular face of the inlet port and outlet port. A second metal disposed within each of the annular grooves, the second metal having a yield strength greater than the yield strength of the first metal.

In another embodiment of the present invention, a method of refurbishing a damaged valve is disclosed comprising receiving a damaged valve assembly, the valve assembly comprising a valve housing having generally collinear inlet and outlet ports in the side walls thereof and an interior annular face about each of the inlet and outlet ports, the housing comprises a first metal with a yield strength and the side walls having a predetermined thickness. A chamber is disposed between the inlet and outlet ports, wherein the vertical axis of the chamber is normal to longitudinal axes of the inlet and outlet ports and a sealing member is disposed within the chamber having an axial bore therethrough. The method further comprises removing the sealing member from the chamber of the valve housing and creating a U-shaped substantially smooth annular groove about the interior annular face of the inlet port, wherein a horizontal axis of the U-shaped groove is normal to the interior annular face of the inlet port. Additionally, the method comprises creating a U-shaped substantially smooth annular groove about the interior annular face of the outlet port wherein a horizontal axis of the U-shaped groove is normal to the interior annular face of the outlet port. The method also comprises heating the valve housing to at least approximately 500 degrees Fahrenheit after creating said annular grooves. Once heated, the method further comprises placing a second metal within each of the annular grooves, the second metal having a yield strength greater than the yield strength of the first metal. After depositing the second metal in the groove, the method comprises heating the valve housing to at least 950 degrees Fahrenheit for approximately one hour per inch of the predetermined side wall thickness, allowing the valve housing to cool and placing the sealing member into the chamber after step.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes an improved method and system of high pressure valve refurbishment and/or manufacture. The improved system results in decreased wear and improved resistance to abrasion when controlling the flow of fluids in high pressure systems containing abrasive materials such as sand. It is intended that the method and resulting valve assembly devices of the present invention be operable with different types of materials and valve configurations so long as the end result of improved sealing is achieved. Bearing that in mind, the valve assembly of the present invention, in accordance with one aspect of the invention, may be broadly described as a housing having generally collinear inlet and outlet ports in the side walls thereof and an interior annular face about each of the inlet and outlet ports. The housing is made of a first metal such as steel with a pre-determined yield strength. A chamber is located between the inlet and outlet ports. A vertical axis of the chamber is normal to longitudinal axes of the inlet and outlet ports and a sealing member disposed within the chamber. In one aspect of the invention, the sealing member is a cylindrical plug with an axial bore therethrough. An annular groove is disposed about the interior annular face of the inlet and outlet ports. A second metal is disposed within each of the annular grooves. The second metal has a pre-determined yield strength higher than the yield strength of the first metal.

Figure 1:
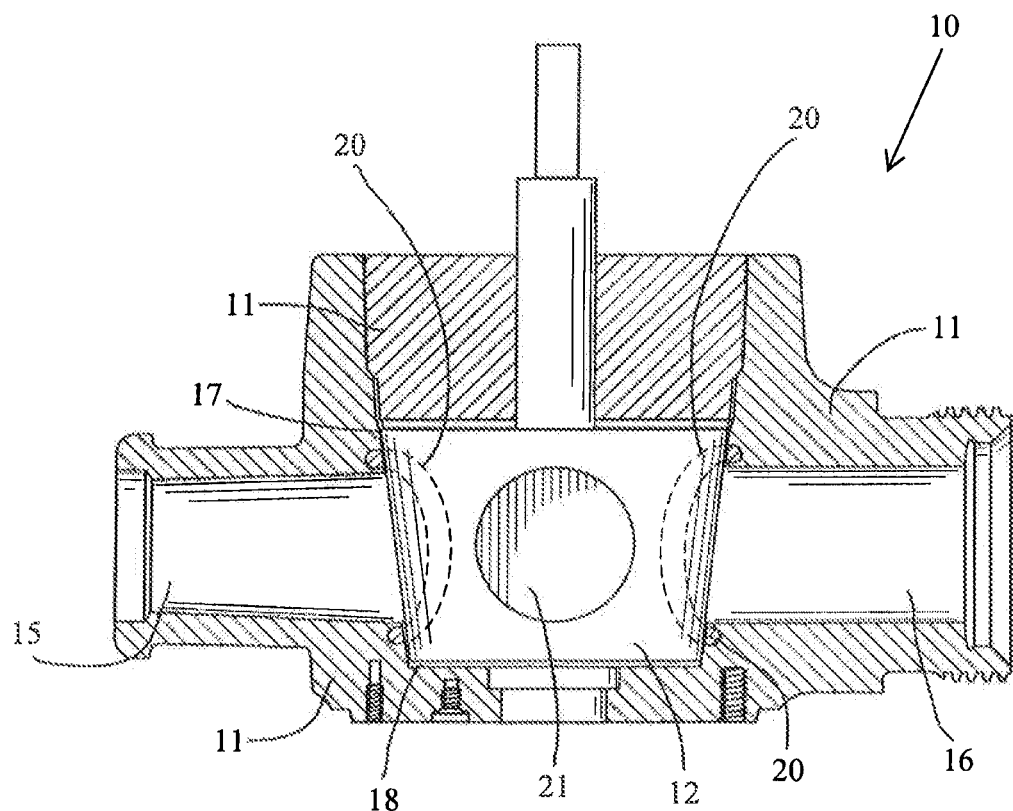
FIG. 1 is a side cross-sectional view of a valve assembly in accordance with one embodiment of the invention.

The present invention is intended to be operable with numerous valve configurations and has particular application in the refurbishment of valves used in to regulate flow of abrasive materials in high-pressure environments. Referring now specifically to the figures with reference to one exemplary embodiment, a valve assembly 10 is generally shown in FIG. 1. The valve 10 has a housing 11, and ported plug valve sealing member 12 rotatable relative to the housing 11 and positioned between inlet port 15 and an outlet port 16.

Figure 2:
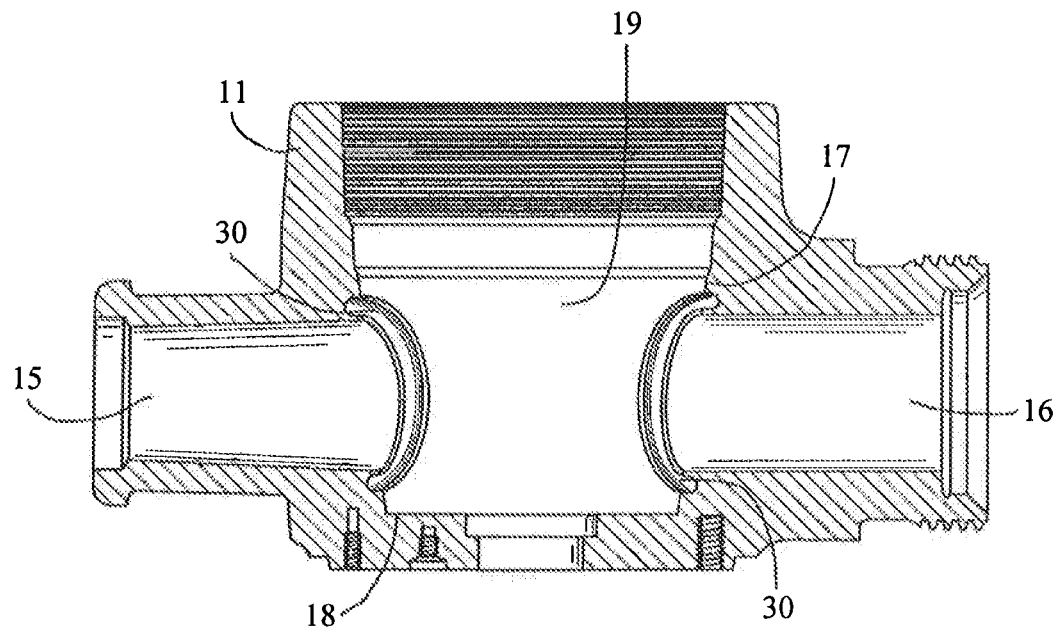
FIG. 2 is a side cross-sectional view of a valve body in accordance with one embodiment of the invention.
Figure 3:
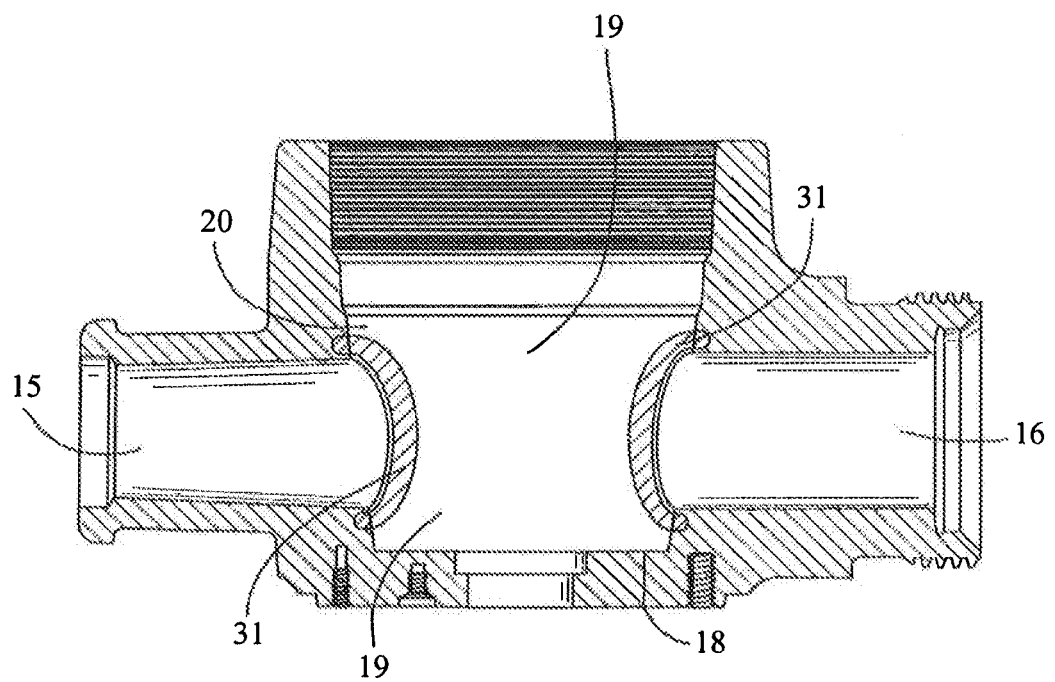
FIG. 3 is a side cross-sectional view of a valve body in accordance with one embodiment of the invention.

With reference generally to FIGS. 1 through 3, the housing 11 contains a cylindrical bore with cylindrical side walls 17 and a bottom wall 18 defining a valve chamber 19. The top of the chamber is closed by means of a flange member held in position by threaded cap screws or an acme screwed lid with mating threads in the body. Positioned within this valve chamber is the rotatable valve sealing member 12 having a port 21 extending therethrough. Extending from the top of the valve sealing member 12 in a wrench head extension with a threaded portion, whereby the valve member 12 can have the you 21 thereof rotated into and out of register with the inlet and outlet ports 15 and 16, respectively. In this manner, as the valve member 12 is rotated, port 21 provides a means whereby fluid may be transferred from the inlet port 15 through the outlet port 16. While the interior of the valve chamber 19 is cylindrical, the inlet port 15 and outlet port 16 have a flat interior annular face.

The housing 11 of the valve assembly 10 can be made of a steel alloy as is known in the art having a yield strength ranging from 75,000 to 115,000 pounds per square inch and tensile strength ranging from 95,000 to 150,000 pounds per square inch. While steel is specifically referenced herein, other metal alloys may be used to suit a particular purpose.

Figure 4A:
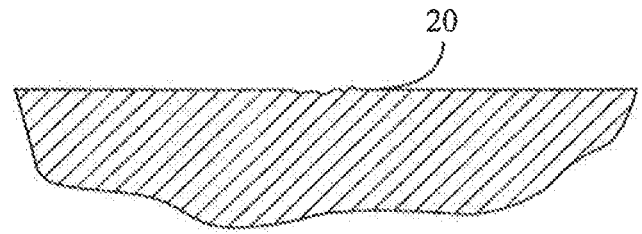
FIGS. 4a through 4d. are a side cross-sectional views of a surface of a valve body in accordance with one embodiment of the invention.
Figure 4B:
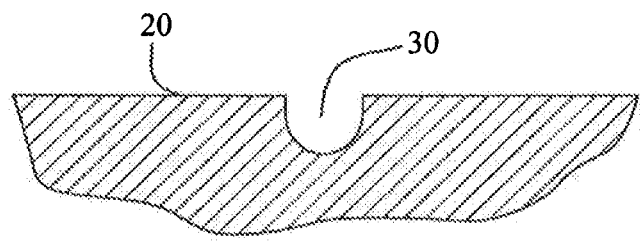
Figure 4C:
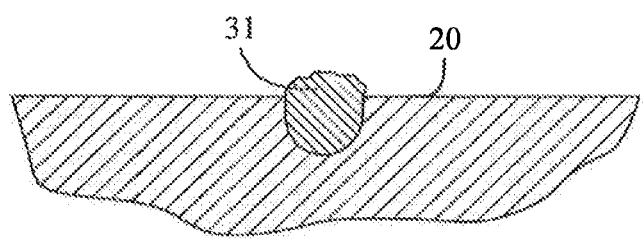
Figure 4D:
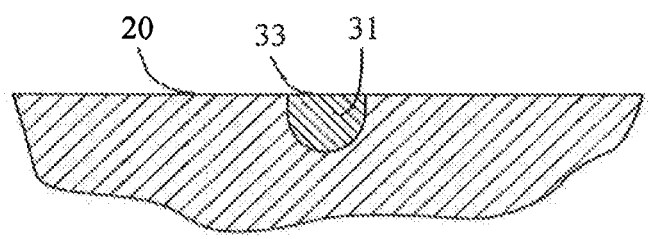
Figure 5:
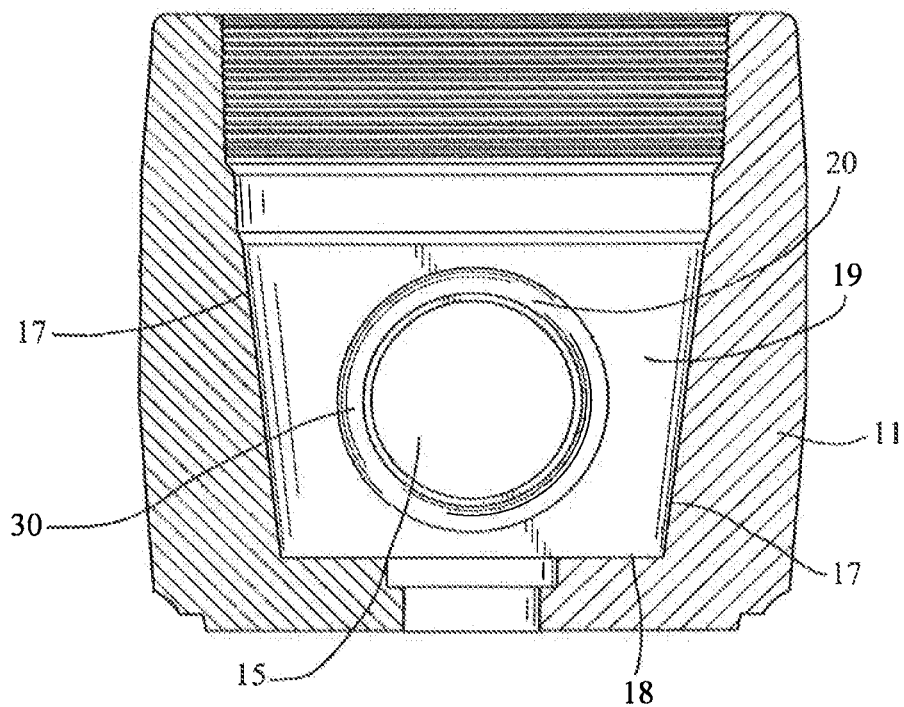
FIG. 5 is a side cross-sectional view of a valve body in accordance with one embodiment of the invention.

In some instances an O-ring made of a resilient material (such as rubber) is located on the valve member 12 about the annular face of port 21. In other instances, an O-ring is located about the interior annular face of inlet port 15 and outlet port 16. When operating the valve assembly in high-pressure (e.g., 8,000 to 18,000 pounds per square inch) environments, abrasive materials such as sand abrades the areas about the interior annular face of the inlet port 15 and outlet port 16 (see e.g., FIG. 4a) reducing the ability of the valve member 12 to effectively operate as a seal when the port 21 is rotated out of register with the inlet and outlet ports 15,16.

With reference now generally to FIGS. 1-5, in the event a valve assembly 10 fails a pressure test, the valve has conventionally been thrown away and replaced resulting in unwanted expenditures. A method has been devised of refurbishing valves damaged in this manner comprising receiving a damaged valve assembly as described herein and removing the valve sealing member 12 from the chamber 19 of the valve housing 11. A U-shaped, substantially smooth, annular groove 30 is machined about the interior annular face 20 of the inlet port 15 and outlet port 16. A longitudinal axis of the U-shaped groove 30 is normal to the flat surface of the interior annular face 20 of the inlet and outlet ports 15,16. In one aspect of the invention, the U-shaped groove comprises substantially parallel side walls with a curvilinear bottom, much like a U. In another aspect of the invention, the U-shaped groove comprises a more open U shape with curvilinear side walls and a curvilinear bottom. In this aspect, the "open-faced" U creates a larger surface area for refurbishment with a more shallow groove. In any event, the smooth U-shaped groove provides an even surface that is better suited to receive and bond with the second metal 31.

In accordance with one aspect of the invention, the specific geometry of the U-shaped grooves range from approximately 0.2 to 0.4 inches wide and approximately 0.1 to 0.2 inches deep. While a U-shaped geometry is referenced as a preferred embodiment, it is understood that other shaped grooves are contemplated for use herein including, but without limitation, V-shaped grooves or rectangular-shaped grooves.

Once the U-shaped groove 30 is machined into the interior annular face 20 of the inlet and outlet ports, the valve housing 11 is heated from approximately 400 to 600 degrees Fahrenheit. While maintaining the temperature of the valve housing, a second metal 31 is placed within each of the annular grooves. In one aspect of the invention, the second metal 31 completely fills the U-shaped groove and exceeds the capacity of the groove extending outside the upper surface of the interior annular face 20 of the inlet port and outlet port.

After the second metal 31 is placed within the annular groove 30, the valve housing 11 is heated to a temperature ranging from approximately 950 to 1200 degrees Fahrenheit for approximately one hour of every inch of thickness of the side wall of the valve housing. Advantageously, the heating and cooling process increases the resistance to brittle fracture and relaxes residual stresses in the heat affected zone at the bonding point of the original base metal and the second material being deposited. Once the heating process is complete, the valve housing 11 is allowed to cool and the area about the annular grooves 30 is machined so that the top surface 33 of the second metal 31 within the grooves is coplanar with the surrounding interior annular face 20 of the inlet and outlet ports.

In accordance with one aspect of the invention, the second metal 31 is placed within the annular grooves 30 by a welding process such as SMAW (shielded metal arc welding), MIG (metal arc-inert gas), TIG (tungsten arc-inert gas). In accordance with one aspect of the invention, the second metal 31 may be a welding rod which is disposed in the groove as a weld bead filling the entire groove with the second metal 31. In accordance with one embodiment, the weld bead is deposited within the groove such that the height of the bead is greater than the depth of the groove spilling out over the side edges of the groove (see e.g., FIG. 4c). At the termination of the heating/cooling cycle referenced above, any weld bead that was outside the shaped groove is machined to create a smooth transition from the groove to the interior annular face of the inlet and/or outlet ports such that the top of the second metal is substantially coplanar with the interior annular face of the inlet and/or outlet ports (see e.g., FIG. 4d).

In accordance with one embodiment of the invention, the second metal 31 comprises an alloy containing at least nickel, chromium, cobalt, and molybdenum having a yield strength ranging from 75,000 to 115,000 pounds per square inch and a tensile strength ranging from 95,000 to 150,000 pounds per square inch. In one aspect of the invention, the alloy comprises at least 60 to 70 percent nickel, 20 to 25 percent chromium, 7 to 11 percent molybdenum, and 10 to 12 percent cobalt. Other materials for the second metal may also be used and fall within the spirit of the invention described herein, including alloys containing carbon steel, copper, phosphorus, sulfur, aluminum, silicon, iron, and magnesium.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus-function are expressly recited in the description herein. Accordingly, the scope of the invention should be determined solely by the appended claims and their legal equivalents, rather than by the descriptions and examples given above.

The invention claimed is:

1. A method, comprising:
   (a) receiving a valve housing having generally collinear inlet and outlet ports in the side walls thereof and an interior annular face about each of the inlet and outlet ports, the housing comprising a first metal with a yield strength and the side walls having a predetermined thickness;
   (b) creating an annular groove about an interior annular face of the inlet port;
   (c) creating an annular groove about an interior annular face of the outlet port;
   (d) heating the valve housing to between approximately 400 and 600 degrees Fahrenheit after creating said annular grooves;
   (e) placing a second metal within each of the annular grooves, the second metal having a yield strength, wherein the yield strength of the first metal is less than the yield strength of the second metal; and
   (f) after placing the second metal within each of the annular grooves, heating the valve housing to between approximately 950 and 1200 degrees Fahrenheit for approximately one hour per inch of the predetermined side wall thickness.

2. The method of claim 1, wherein the temperature of the valve housing is maintained at between approximately 400 and 600 degrees Fahrenheit during placement of the second metal within each of the annular grooves.

3. The method of claim 1, wherein the grooves have a U-shaped geometry.

4. The method of claim 3, wherein the U-shaped grooves are smooth.

5. The method of claim 3, wherein the second metal is placed into the grooves by a welding process.

6. The method of claim 3, wherein the second metal comprises an alloy containing nickel, chromium, cobalt, and molybdenum.

7. A method of refurbishing a damaged valve, comprising:
   (a) receiving a damaged valve assembly, the valve assembly comprising:
      (i) a valve housing having generally collinear inlet and outlet ports in the side walls thereof and an interior annular face about each of the inlet and outlet ports, the housing comprising a first metal with a yield strength and the side walls having a predetermined thickness;
      (ii) a chamber disposed between the inlet and outlet ports, wherein the vertical axis of the chamber is normal to longitudinal axes of the inlet and outlet ports; and
      (iii) a sealing member disposed within the chamber having an axial bore therethrough;
   (b) removing the sealing member from the chamber of the valve housing;
   (c) creating a U-shaped substantially smooth annular groove about the interior annular face of the inlet port after step (b), wherein a horizontal axis of the U-shaped groove is normal to the interior annular face of the inlet port;
   (d) creating a U-shaped substantially smooth annular groove about the interior annular face of the outlet port after step (h), wherein a horizontal axis of the U-shaped groove is normal to the interior annular face of the outlet port;
   (e) heating the valve housing to approximately 500 degrees Fahrenheit after creating said annular grooves;
   (f) after step (e), placing a second metal within each of the annular grooves, the second metal having a yield strength, wherein the yield strength of the first metal is less than the yield strength of the second metal; and (g) after step (f), heating the valve housing to at least 950 degrees Fahrenheit for approximately one hour per inch of the predetermined side wall thickness;

(h) allowing the valve housing to cool after step (g); and (i) placing the sealing member into the chamber after step (h).

8. The method of claim 7, wherein a quantity of the second metal is placed within the area about each of the U-shaped grooves such that the height of the second metal within each of the U-shaped grooves is greater than the depth of the U-shaped grooves.

9. The method of claim 8, wherein the second metal completely fills the U-shaped grooves.

10. The method of claim 8, further comprising the step of removing any portion of the second metal that is not within the U-shaped groove after the step recited in claim 8.

11. The method of claim 8, wherein the yield strength of the second metal ranges from 95,000 to 135,000 pounds per square inch.

12. The method of claim 8, wherein the second metal is an alloy containing at least carbon steel or an alloy containing at least nickel and molybdenum.

13. The method of claim 9, wherein a top surface of the second metal within the U-shaped groove about the interior annular face of the inlet port is co-planar with the annular face of the inlet port and a top surface of the second metal within the U-shaped groove about the interior annular face of the outlet port is co-planar with the annular face of the outlet port.

\* \* \* \* \*